United States Patent Office.

JOHN L. TENNEY AND JOHN W. BAILEY, OF SKOWHEGAN, MAINE.

Letters Patent No. 65,301, dated May 28, 1867.

IMPROVED COMPOUND FOR COATING OIL-CLOTHS, &c.

*The Schedule referred to in these Letters Patent and making part of the same.*

TO ALL WHOM IT MAY CONCERN:

Be it known that we, JOHN L. TENNEY and JOHN W. BAILEY, of Skowhegan, in the State of Maine, have invented a new and useful Preparation for the Coating of Oil-Cloths, Carriage-Curtains, &c., &c.; and we do hereby declare the following to be a full and exact description of the same.

The articles or materials we use in the above preparation are slate and clay, the proportions thereof being nine (9) parts of ground slate to one (1) of ground clay. We take ingots of clay, burned to a cherry red, and crushed so as to be ground in a mill. The two materials are then thoroughly incorporated and bolted in a No. (70) seventy bolt of brass wire. After being thus treated it is ready to be mixed with linseed oil and japan, and applied as other paints are for the body coat of carpets, curtains, or other cloths, as the case may be.

What we claim, and desire to secure by Letters Patent, is—

The use of ground slate and clay, when compounded in or about the proportions set forth, and used in the manner and for the purposes described.

In testimony that we claim the foregoing, we herewith affix our signature in presence of two witnesses.

J. W. BAILEY,
JOHN L. TENNEY.

Witnesses:
HENRY W. WOODS,
C. K. TURNER.